United States Patent [19]

Alexanian

[11] Patent Number: 5,320,121
[45] Date of Patent: Jun. 14, 1994

[54] VEHICLE WASHING SYSTEM

[75] Inventor: Vahan Alexanian, P.O. Box 308, Stony Ridge, Ohio 43463

[73] Assignees: Harry Alexanderian, West Pittston, Pa.; Vahan Alexanian, Perrysburg, Ohio

[21] Appl. No.: 97,972

[22] Filed: Jul. 27, 1993

[51] Int. Cl.$^5$ ............................................. B08B 3/02
[52] U.S. Cl. .................................... 134/123; 134/181; 134/172
[58] Field of Search ................. 134/45, 123, 201, 181, 134/172

[56] References Cited

U.S. PATENT DOCUMENTS

| | | | |
|---|---|---|---|
| 2,854,680 | 10/1958 | Wilson | 134/123 |
| 3,261,369 | 7/1966 | Thiele | 134/123 |
| 3,299,901 | 1/1967 | Axe et al. | 134/123 |
| 3,391,701 | 7/1968 | Richardson et al. | 134/123 |
| 3,517,694 | 6/1970 | Lieffring | 134/123 |
| 4,957,126 | 9/1990 | Allaeys | 134/181 |

FOREIGN PATENT DOCUMENTS 124479  6/1986  U.S.S.R. ............................ 134/123

Primary Examiner—Frankie L. Stinson
Attorney, Agent, or Firm—Marshall & Melhorn

[57] ABSTRACT

Apparatus is provided which enables an operator to wash vehicles of various shapes, sizes and configurations efficiently and thoroughly. A pair of spaced longitudinally extending rails is suspended along either side of a vehicle washing station. A carriage beam extends transversely between the rails and is mounted for back and forth movement longitudinally therealong. A traversing carriage is mounted upon the carriage beam, and a travelling scaffold is suspended from the traversing carriage for movement therewith. A washing unit is mounted upon the travelling scaffold for movement up and down therealong. The washing unit includes a cantilevered boom upon which spray nozzles are mounted for discharging selected washing fluids under high pressure. The boom is pivotable upwardly and downwardly in a vertical plane, and is rotatable about its longitudinal axis. The nozzles are mounted upon the boom for oscillating pivoting movement. An operators platform is provided for movement around the vehicle with the washing unit as washing proceeds.

16 Claims, 4 Drawing Sheets

VEHICLE WASHING SYSTEM

BACKGROUND OF THE INVENTION

1. Field of the Invention

This invention relates generally to apparatus for washing automotive vehicles, and more particularly to such apparatus for washing large vehicles of irregular configuration and widely varying sizes such as highway motor trucks.

2. Description of the Prior Art

Various devices have been proposed over the years both for facilitating manual washing and for so-called automatic washing of vehicles. Some of the devices merely employ high pressure jets of water and/or washing compounds, while others utilize liquid sprays in combinations with brushes or cloths contacting the vehicular surfaces to be washed. The prior art devices perform satisfactorily in washing vehicles such as automobiles, wherein dimensions generally vary within rather narrow units. However, they have not proven entirely satisfactory for the washing of highway motor trucks and trailers, wherein both the dimensions and the configuration, or profile, of the vehicles to be washed vary widely. In order to properly clean such vehicles it is necessary to wash not only the opposite sides and the top of the trailer and the tractor, but also the rear of the trailer and front of the tractor, the front of the trailer and rear of the tractor cab as well as other equipment between the trailer and the cab, the undercarriage and fuel tanks of the vehicle, and the wheels. Machines available heretofore have not been capable of doing an effective job of washing an entire rig. As a result, the washing of such rigs heretofore has been largely a manual, labor intensive operation requiring the services of several employees at anytime a facility is in operation. In order to service the trucking industry, the facility must normally in continuous operation. Business is very dependent upon weather conditions. As will thus be readily apparent, staffing of the facility is speculative and inefficient, and labor costs can be prohibitive.

SUMMARY OF THE INVENTION

In accordance with the present invention, the deficiencies of the prior art devices are obviated by providing a vehicle washing apparatus which is highly effective in washing all exposed surfaces of vehicles of various shapes, sizes and configurations. Moreover, the apparatus enables a single operator to wash an entire vehicle in a relatively short time while achieving better cleaning and with more efficient use of washing fluid than has been possible heretofore. In a preferred embodiment a pair of spaced, longitudinally extending rails is suspended within a truck washing bay along either side of the truck washing station. A carriage beam extends transversely between the rails and is mounted for back and forth movement longitudinally therealong. A traversing carriage is mounted on the carriage beam, and a travelling scaffold is suspended from the traversing carriage for movement therewith. A washing unit is mounted for vertical movement along the travelling scaffold. The washing unit includes a cantilevered boom upon which spray nozzles are mounted for discharging selected fluids under high pressure. The cantilevered boom is pivotable upwardly and downwardly in a vertical plane, and is rotatable through selected angles about its longitudinal axis. The nozzles are mounted upon the boom for oscillating pivoting movement. An operator's platform is provided on the washing unit for movement therewith around the vehicle as washing proceeds.

It is thus an object of the invention to provide an improved apparatus for washing automotive vehicles.

Another object of the invention is to provide an apparatus capable of effectively washing vehicles of different shapes, sizes and configurations.

Another object of the invention is to provide an apparatus for washing automotive vehicles which is labor-efficient and relatively inexpensive to operate.

Still another object of the invention is to provide an apparatus capable of washing remote exposed surfaces of automotive vehicles.

Yet another object of the invention is to provide a relatively inexpensive apparatus for thorough and effectively washing all exposed surfaces of automotive vehicles having a wide range of sizes and configurations.

Other objects and advantages of the invention will become more apparent during the course of the following description, when taken with the accompanying drawings.

BRIEF DESCRIPTION OF THE DRAWINGS

In the drawings, wherein like numerals are employed to designate like parts throughout the same.

DESCRIPTION OF THE PREFERRED EMBODIMENT

Figure 1:
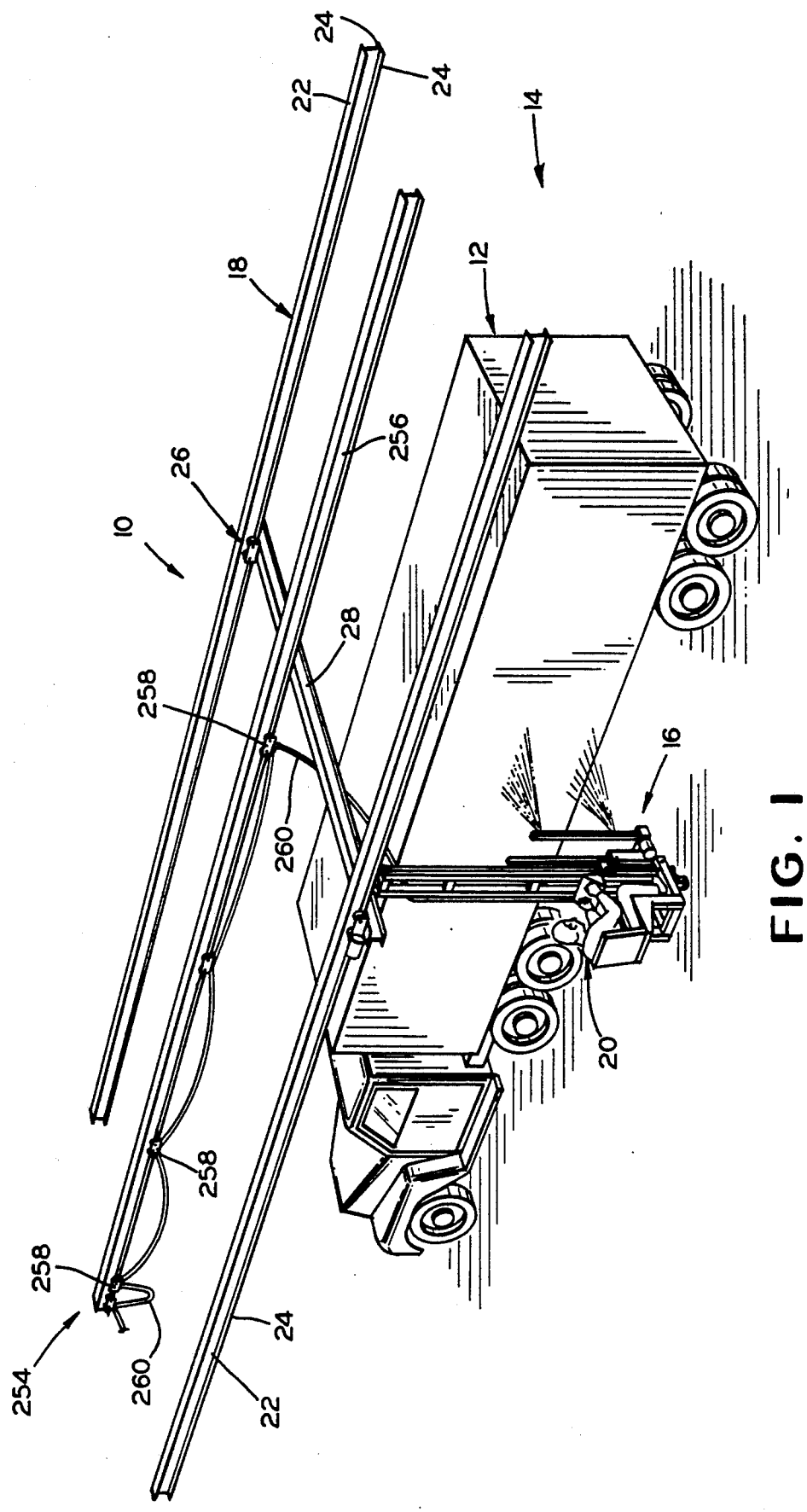
FIG. 1 is a perspective view of a vehicle washing installation embodying the invention.

With reference to the drawings and in particular to FIG. 1, there is illustrated generally at 10 a mechanized vehicle washing system in accordance with the invention. Although not limited to such facilities, the washing system is designed for installation within an enclosed building (not shown). Since the system is of particular utility in the washing of large, over-the-road vehicles such as tractor-trailer rigs having limited maneuverability, it may advantageously be installed for drive-through operation wherein a vehicle to be washed enters at one end of a building and, following washing, exits at the opposite end of the building. To that end, a vehicle 12 of any length and configuration enters a wash bay 14 from the right as viewed in FIG. 1, and stops at a suitable position within the wash bay. A washing unit 16 suspended from an overhead carrier system 18 is manipulated by an operator 20 to direct spray patterns of suitable fluids at high pressure against the exposed surfaces of the vehicle.

As will be hereinafter described, the washing unit 16 can be manipulated by the operator 20 to direct high pressure spray jets against even remote exposed surfaces of the vehicle. Since the washing unit is so manipulated, the system can be utilized in washing virtually any type vehicle. To that end the overhead carrier system 18 is preferably of such length as to accommodate vehicles of the maximum length anticipated in a single position. However, should vehicles of greater than design length be received, they can be accommodated by washing a forward section and then advancing the vehicle within the wash bay.

The washing unit 16 of the invention is adapted to traverse the perimeter of the vehicle 12 within the wash bay so as to be able to spray fluid under high pressure against the sides as well as the ends, the top and the under carriage of the vehicle. To that end, the overhead carrier system 18, from which the washing unit 16 is suspended, includes a pair of longitudinally disposed side rails 22 mounted above the washing area as by being suspended from the framework of a building enclosure (not shown) within which the washing facility is housed.

The side rails are preferably of a conventional I-beam or wide flange type having opposite lower flanges 24 upon which wheeled carriers, identified generally at 26, rollingly ride in a suitably controlled driven manner as will be hereinafter described. A carriage beam 28, again preferably of I-beam or wide flange configuration, extends transversely of the side rails and is suspended from the carriers 26. Thus, as the carriers 26 are moved along the side rails 22 in unison, the carriage beam likewise moves longitudinally along the side rails.

Figure 2:
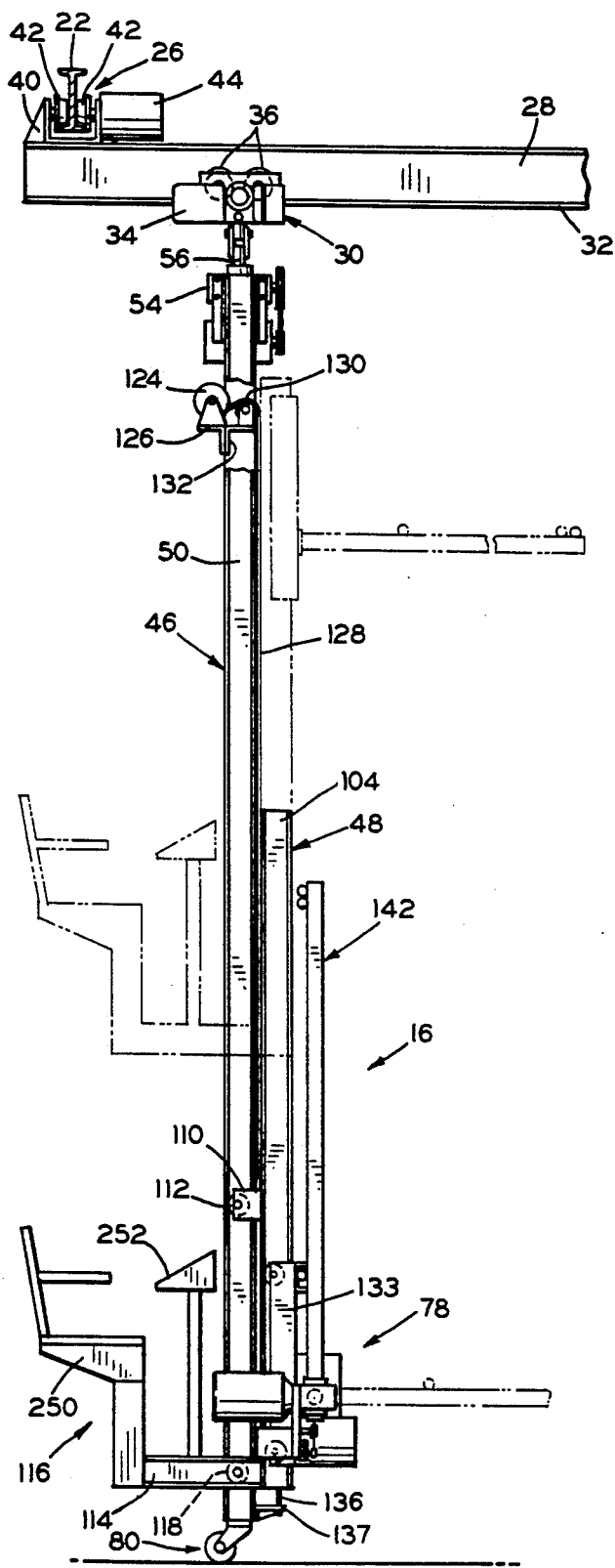
FIG. 2 is an enlarged elevational view of the washing apparatus as viewed from the right in FIG. 1.
Figure 3:
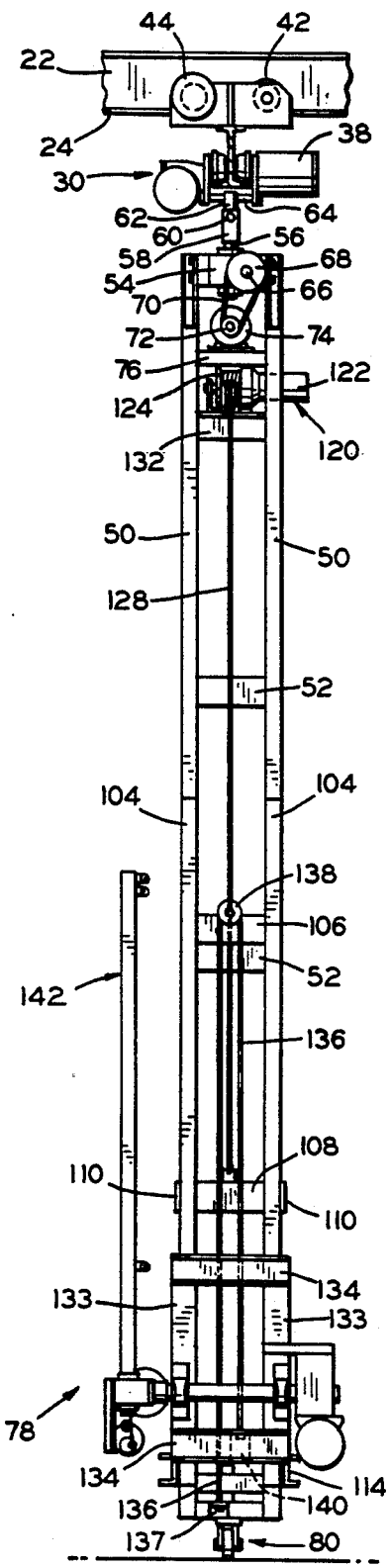
FIG. 3 is a front elevation as viewed from the right in FIG. 2.

As best seen in FIGS. 2 and 3, the washing unit 16 is suspended beneath a wheeled carriage 30 rollingly riding upon lower flanges 32 of the carriage beam 28. The wheeled carriage comprises a framework 34 upon which pairs of flanged wheels 36 are mounted for riding upon the flanges 32 of the carriage beam. A motor and gear reduction unit 38 mounted upon the framework is drivingly coupled to at least one of the flanged wheels for rotating the wheel to propel the carriage back and forth along the carriage beam 28.

The wheeled carriers 26 similarly comprise a suitable framework 40 upon which pairs of flanged wheels 42 are mounted for riding upon the flanges 24 of the side rails 22. A motor and gear reduction unit 44 mounted upon the framework 40 is drivingly coupled to at least one of the flanged wheels 42 for driving the wheel to propel the wheeled carrier along the associated side rail 22. Thus, by suitably manipulating the motor and reduction units 44, the wheeled carriers 26 and the carriage beam 28 carried thereby can be propelled along the side rails 22 in a controlled manner longitudinally along the wash bay 14. Likewise, by suitably manipulating the motor and reduction unit 38, the wheeled carriage 30 can be propelled along the carriage beam 28 for transversely positioning the washing unit 16 within the wash bay 14.

The washing unit 16 is adapted to encircle the vehicle 12 within the wash bay 14 for directing washing sprays against the entire vehicle from end to end and from top to bottom. To that end, the washing unit includes a travelling scaffold section, identified generally at 46, pivotably suspended beneath the framework 34 of the wheeled carriage 30 and extending to the floor of the wash bay. An elevator section 48 is mounted upon the scaffold section for vertical movement up and down therealong.

The travelling scaffold section includes a generally rectangular frame comprising a pair of spaced upright beams such as channel sections 50 interconnected by cross members 52. The framework is suspended from the wheeled carriage 30 so as to be pivotable about a vertical axis whereby the washing unit 16 may be maintained in facing relationship with the vehicle as it moves therearound within the wash bay 14. To that end, a conventional rotary gear drive unit 54 is suitably affixed to the upper end of the upright channels 50. A drive shaft 56 extending from the gear drive unit has affixed thereto a yoke 58 which is pivotably coupled as by a pin 60 to a hanger depending downwardly from the framework 34 of the wheeled carriage 30. The hanger 62 is, in turn, suspended from a pivot shaft 64 pivotably carried by the framework 34. As will thus be readily apparent, the suspended frame is adapted to swing about orthogonal axes defined by the pin 60 and the pivot shaft 64.

The gear drive unit 54 may, for example, be of a conventional worm and spur gear type wherein the drive shaft 56 is affixed to the spur gear (not shown) and the worm gear (not shown) includes a shaft 66 to which a pulley 68 is affixed. The pulley 68 is coupled as by a belt 70 to a drive pulley 72 of a reversible motor-gear reduction unit 74 mounted upon a base 76 affixed to the channels 50. Thus, by appropriate manipulation of the reversible motor-gear reduction unit 74 the travelling scaffold section 46, and hence the washing unit 16, may be rotated to selected angular positions beneath the wheeled carriage 30.

Figure 4:
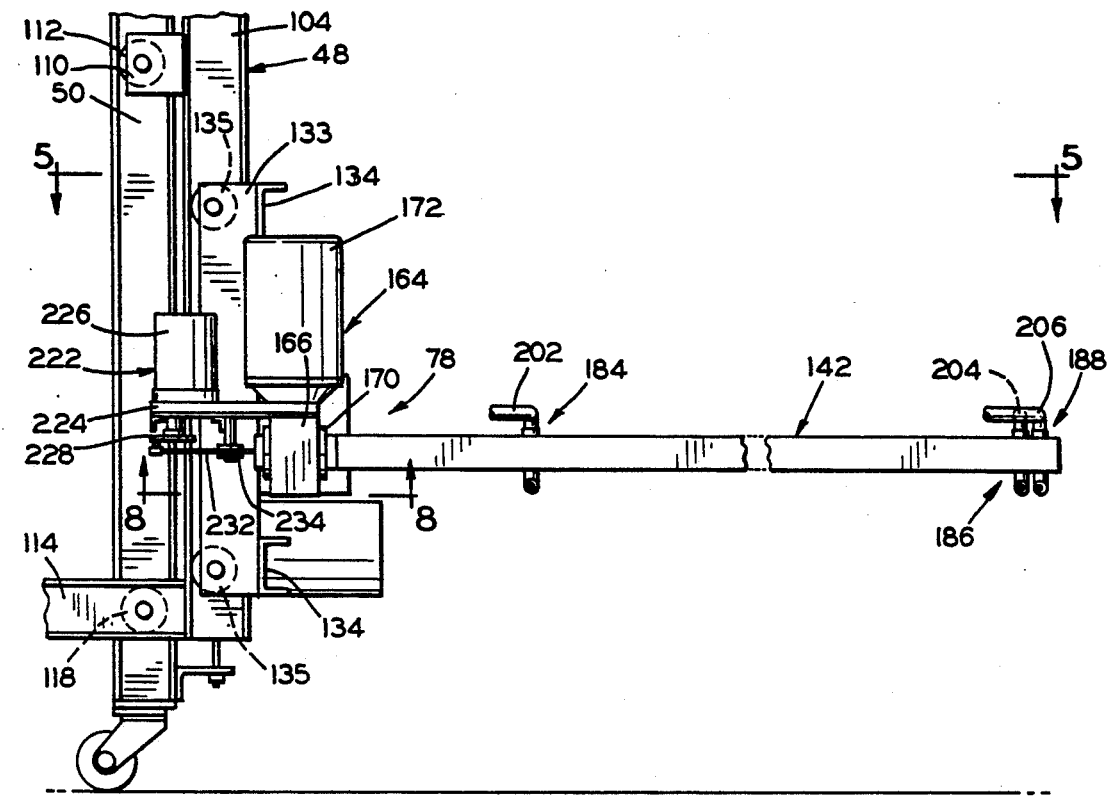
FIG. 4 is an enlarged fragmentary side elevational view of the spray unit showing the spray wand in a lowered, horizontal position.
Figure 9:
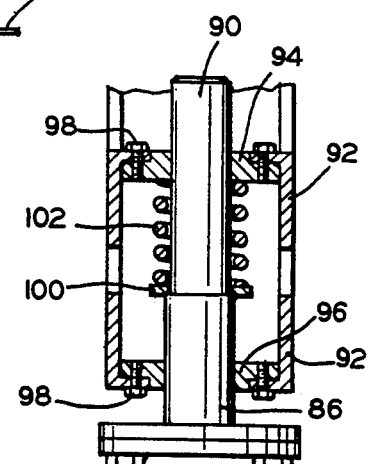
FIG. 9 is a sectional view taken substantially along line 9—9 of FIG. 5.

A caster unit 80 is provided for stabilizing the lower end of the suspended travelling scaffold section 46 while providing for unrestricted lateral movement about the wash bay and pivoting movement about the vertical axis. As best seen in FIGS. 3, 4 and 9, the caster unit may comprise a caster wheel 82 mounted between bifurcated arms 84 affixed to a spindle 86. The caster wheel is adapted for rolling support upon a floor 88 of the wash bay. The spindle 86 axially receives an axle 90. Opposed, spaced channel sections 92 are affixed between the upright channels 50, and upper and lower bushings 94 and 96, respectively, are mounted within openings in the channel sections as by bolts 98. The spindle 86 and the axle 90 are mounted for pivoting movement within the bushings 96 and 94, respectively. A collar 100 is provided at the upper end of the spindle, and a compression spring 102 surrounds the axle 90. A single axle may, of course, take the place of the spindle 86 and the axle 90, with the collar 100 being secured upon the axle. The compression spring acts between the collar 100 and the underside of the upper bushing 94 to cause the caster unit 80 to bear a portion of the weight of the suspended washing unite 16. Since the caster unit bears a portion of the weight, it tends to provide a damping effect and prevent free-swinging pendulum movement of the travelling scaffold section beneath the wheeled carriage 30.

The elevator section 48 carries the spray unit, identified generally at 78, and is adapted for movement up and down along the upright channels 50 of the travelling scaffold section 46. As will be seen in FIGS. 2, 3 and 4, the elevator section more particularly comprises a generally rectangular framework similar to the framework of the scaffold section 46, and formed of spaced upright beams such as channels 104 interconnected by an upper cross member 106 and a lower cross member 108. The lower member 108 has rearwardly directed end wings 110 upon which flanged wheels 112 are mounted for rolling engagement with and between the outwardly directed flanges of the respective upright channels 50. A pair of spaced cantilever beams or channels 114 affixed to the lower ends of the upright channels 104 extend rearwardly of the travelling scaffold 46 along the outside of the upright channels 50 for carrying an operator's platform 116 as will be more fully described. Flanged wheels 118 are mounted on the cantilevered channels 114 for rolling engagement with and between the flanges of the upright channels 50. With the pairs of flanged wheels 112 and 118 confined between the flanges of the upright channels 50 for rolling movement therebetween, the elevator section 48 is adapted for movement freely and smoothly up and down along the travelling scaffold section.

Controlled movement of the elevator section along the travelling scaffold is provided by a winch 120 carried by the travelling scaffold. More particularly, a reversible motor and gear reduction unit 122 having a cable drum 124 is supported by a bracket 126 carried by the upright channels 50. A cable 128 wound upon the drum extends over a pulley 130 carried upon a bracket 132 also affixed to the upright channels 50. The cable extends downwardly along the scaffold section and its free end is attached to a holder affixed to the lower cross member 108 of the elevator section. Thus, by operating the winch 120 to wind the cable 128 upon or unwind it from the drum 124, the elevator section 48 can be selectively raised and lowered along the travelling scaffold section 46.

The washing unit 78 is carried by the elevator section 48 so as to move up and down therewith. As the elevator section moves up or down carrying the washing unit, the washing unit simultaneously moves up or down along the elevator section so that it may move through its range of operating elevations at a greater speed than the elevator section and with minimal travel of the elevator section along the scaffold section 46. It is thus possible for the platform 116 carrying the operator to move vertically at a slower rate and over a reduced distance than the washing unit while still affording the operator excellent visibility for insuring a thorough washing job. To that end, as best seen in FIGS. 2 through 5 the washing unit 78 includes a pair of vertical side angle members 133 interconnected by cross members 134 to form a rigid rectangular frame. Guide rollers 135 carried by the side members 133 are received within the upright channels 104 of the elevator section 48 for rolling engagement therewithin.

A cable 136 anchored at one end to a bracket 137 secured to the channel section 92 at the base of the travelling scaffold section 46, extends over a pulley 138 carried by the upper cross member 106 of the elevator section 48. The other end of the cable 136 is secured to a bracket 140 on the lower cross member 134. As will be apparent in FIGS. 2 and 3, due to the pulley 138 and cable 136 arrangement, as the elevator section 48 is raised or lowered by the cable 128, the washing unit or spry system 78 carried by the elevator section will by simultaneously raised or lowered by a like distance relative to the elevator section. In other words, the spray system will travel twice the distance of the elevator section and at twice the speed of the elevator section. Thus, as the operator's platform 116 moves back and forth between the lowered and raised positions illustrated in solid and broken lines respectively in FIG. 2, the spray system 78 likewise moves between the positions illustrated in solid and broken lines.

The spray system 78 is provided with a wand or spray arm, shown generally at 142, for directing the washing fluid in the form of a high pressure spray against the surfaces of the vehicle 12 in selected directions. In order to provide the coverage desired in delivering the liquid spray, the spray arm is mounted for pivoting up and down movement and for rotational movement about its longitudinal axis. In addition, the spray nozzles carried by the arm are mounted for pivoting oscillatory movement to sweep across an extended area of the surface being washed as will be described.

More particularly, as will be best seen in FIGS. 2 through 5 the wand or arm 142 of the spray system 78 is carried by a shaft 144 journalled for rotation in bearing blocks 146 affixed to the side members 133. A rotary drive unit 148 carried by a bracket 150 affixed to one of the side members 133 is coupled to the shaft 144. A suitably controlled reversible motor 152 carried upon a base 154 beneath the drive unit (FIG. 6), is operably coupled by means of a pulley 156 and a belt 158 to a pulley 160 on the input shaft 162 of the drive unit. By appropriate operation of the reversible motor 152, the drive unit 148 will rotate the shaft 144 within the bearing blocks 146 to swing the spray arm 142 upwardly or downwardly within a generally vertical plane as between the upright and horizontal positions illustrated in solid lines and broken lines, respectively, in FIG. 2. The arm may, as well, be swung downwardly below the horizontal altitude if desired.

Figure 5:
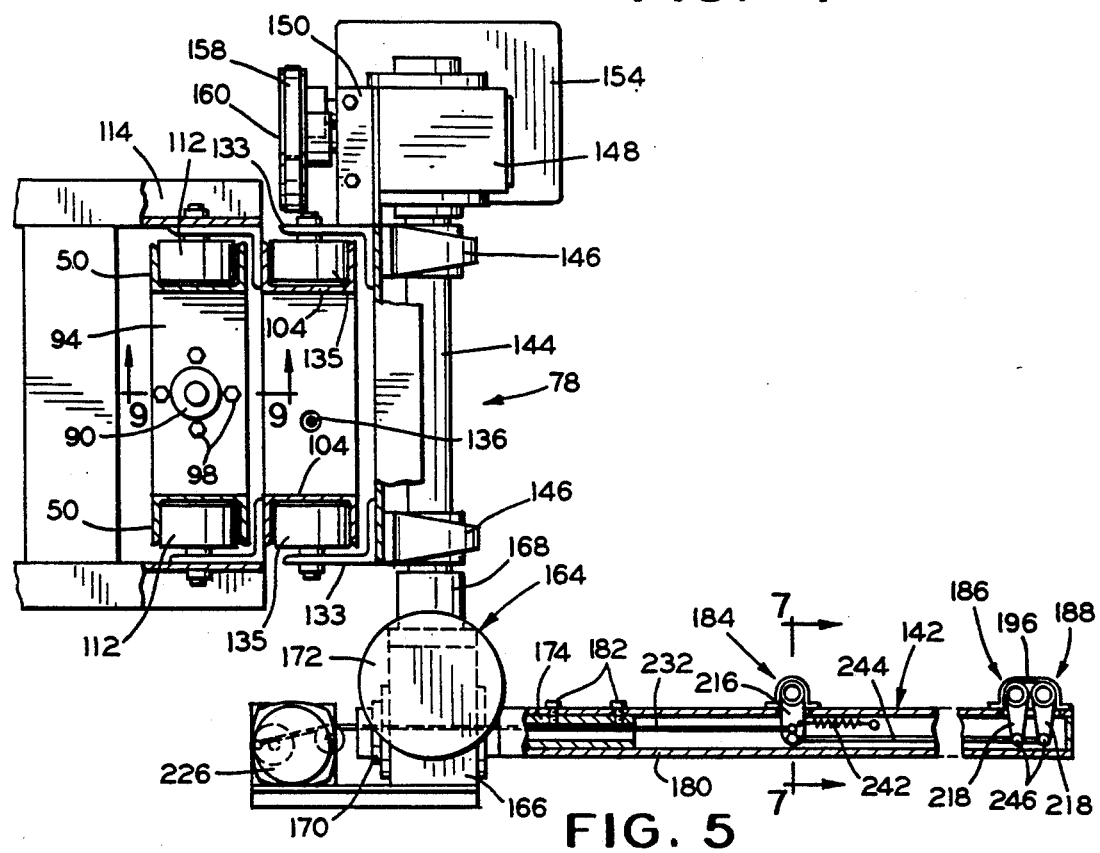
FIG. 5 is a plan view of the spray unit taken substantially along line 5—5 of FIG. 4.
Figure 6:
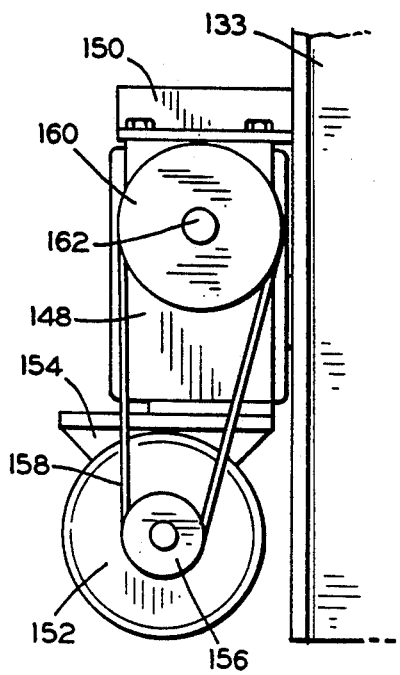
FIG. 6 is a fragmentary side view showing the drive unit for pivotally swinging the spray wand.

The arm 142 is mounted upon the shaft 144 by means of a rotor unit shown generally at 164, providing for rotation of the arm or wand 142 about its longitudinal axis for appropriately directing the spray nozzles mounted thereon as will be described. The rotor unit includes a right angle gear box 166 mounted upon the end of the shaft 144 opposite the rotary drive unit 148 as by a mounting hub 168. As best seen in FIG. 5, a rotor hub 170 extends through the gear box 166 generally transversely of the shaft 144. A reversible motor 172 is coupled to the rotor hub through suitable gears (not shown) in a conventional manner for selectively rotating the rotor hub in either direction.

A tubular insert 174 extends through and is affixed within the rotor hub 170 for rotation therewith as by an end flange 176. A tubular member 178 of complementary cross section positioned axially within the insert 174 extends beyond the insert at the forward end. A tubular shaft 180 slips telescopically over the member 178 and is secured in place as by bolts 182 threaded into a wall of the member 178.

One or more nozzles for dispensing the washing fluids are mounted upon the tubular shaft 180. The number and position of the nozzles along the shaft, as well as the type of nozzle, may vary according to a particular type vehicle for which the facility is intended. It is contemplated that the tubular shaft 180 may be readily removed and replaced for providing different nozzle configurations as appropriate. In a preferred embodiment, by way of example, the tubular shaft 180 may carry three spray heads, identified generally at 184, 186 and 188 (FIG. 4). As will be hereinafter explained, the heads 184 and 186 are employed in washing the major surfaces of a vehicle while the head 188 is particularly adapted to washing recessed areas such as the wheels and undercarriage of the vehicle.

Figure 7:
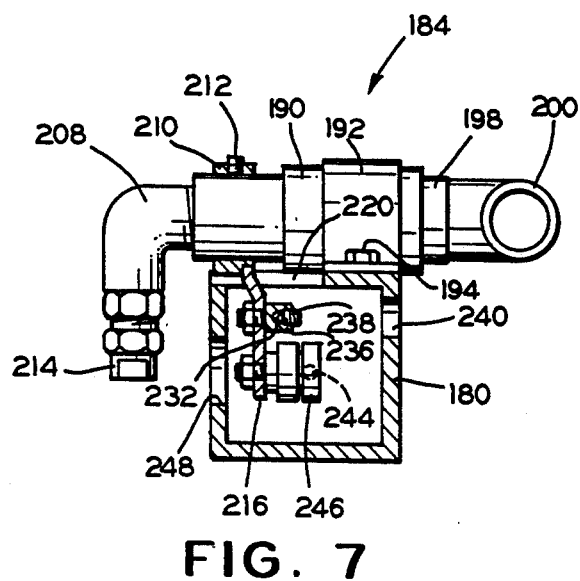
FIG. 7 is an enlarged view, partially in section, taken substantially along line 7—7 of FIG. 5.
Figure 8:
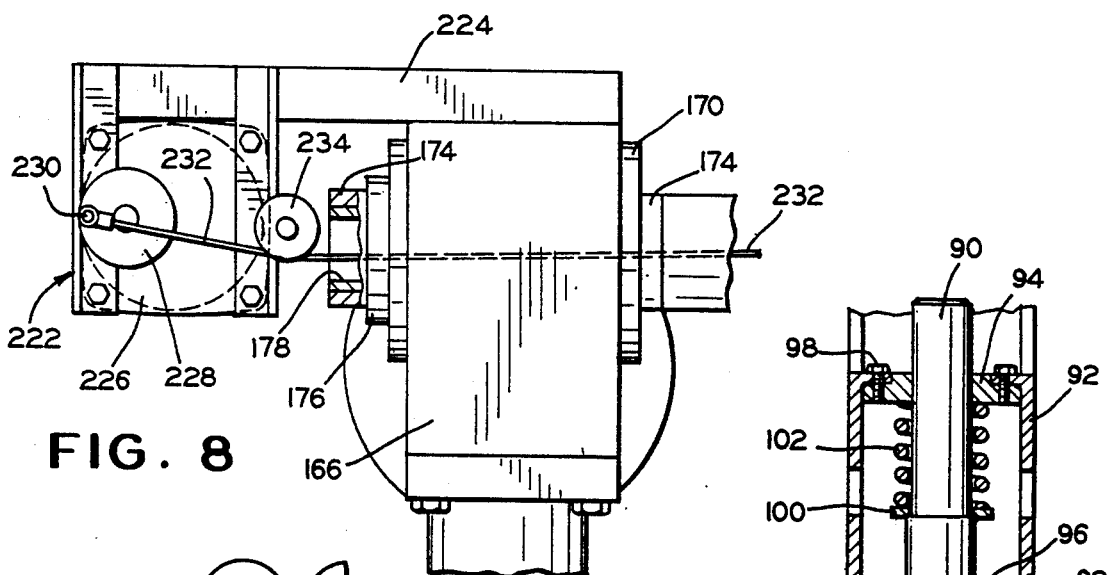
FIG. 8 is a bottom plan view, with parts broken away, taken substantially along line 8—8 of FIG. 4.

The spray heads may be of generally identical construction, and thus like numerals will be employed in identifying like parts in their description. As indicated above, the spray heads are mounted for pivoting oscillating movement about axes perpendicular to the shaft 180. To that end, as best seen in FIG. 7 each spray head comprises a bushing 190 affixed to the tubular shaft 180 by a hold down strap 192 suitably secured to the shaft as by lag bolts 194. The side-by-side bushings of the spray heads 186 and 188 may be secured by a single elongated hold down strap 196 as shown in FIG. 5. A pipe section 198 is journalled for rotational movement within the bushing. A coupling 200 is provided at one end of the pipe section for connecting the spray heads 184, 186 and 188 by means of flexible hoses 202, 204 and 206, respectively, to suitably controlled sources (not shown) of fluids under pressure. An elbow 208 carrying a spray nozzle tip unit 214 is suitably coupled to the other end of the pipe section 198 as by a threaded connection for facilitating removal and replacement of the nozzle tip.

In order to rotate the pipe section 198 in an oscillating manner, and to thereby swing the nozzle tip 214 in an arc, an operating arm 216 is affixed to a collar 210 surrounding the pipe section 198 of the spray head 184 and secured by a setscrew 212, and somewhat modified operating arms 218 are similarly affixed to the pipe sections of the spray heads 186 and 188. The operating arms project through openings 220 in the adjacent wall of the tubular shaft 180 and into the interior of the shaft. A drive unit, identified generally at 222, provides motive power for swinging the nozzle tips in selected arcs.

The drive unit is carried by a bracket structure 224 affixed to the rotor unit 164, and includes a motor and gear reduction unit 226 for driving a wheel 228 having an eccentric connecting post 230 thereon. The motor and gear reduction unit are preferably of a conventional variable speed type. An operating cable 232 attached at one end to the eccentric post 230, rides over the grooved peripheral surface of a freely rotatable guide roller 234 carried by the bracket structure 224. The operating cable extends axially along the interior of the tubular member 178 and the shaft 180 and is attached at its other end to a cable clamp 236 (FIG. 7) affixed to the operating arm 216. The cable is adjustably fastened within the clamp by a setscrew 238. An access opening 240 is provided in the wall of the tubular shaft 180 opposite the clamp to permit access to the setscrew for selectively adjusting the length of the operating cable.

A tension spring 242 (FIG. 5) anchored at one end to the tubular shaft 180 and connected at its opposite end to the operating arm 216, acts on the operating arm to maintain the cable taut and retract the swinging operating arm upon the return stroke as the wheel 228 rotates. A rigid connecting rod 244 is coupled to the operating arm 216 as by a swivel clamp 246 suitably bolted to the arm. At its remote end the connecting rod is similarly affixed to the arms 218 of the spray heads 186 and 188 by swivel clamps 246. Access openings 248 are provided in the wall of the tubular shaft 180 opposite the swivel clamps whereby the clamps can be suitably positioned along the connecting rod to vary the angular relationship between the operating arms 216 and 218.

As will thus be readily apparent, as the drive unit 222 is operated to rotate the wheel 238, the eccentric connecting post 230 will cause the cable 232 to be retracted within the tubular shaft 180 upon one half revolution of the wheel. As a result the operating arms 216 and 218, and hence the elbows 208 carrying the nozzle tip units 214, will swing in an arc. Upon the second half revolution of the wheel the cable will be advanced, allowing the arm 216 to be retracted by the tension spring 242 and swing back through an arc in the opposite direction. Since the arms 216 and 218 of the spray heads 184, 186 and 188 are interconnected by the rod 244, they will swing or oscillate back and forth in unison in response to rotation of the wheel 228. The rate of oscillation can, of course, be controlled by adjusting the variable speed motor and gear reduction unit, while the length of the stroke or arc can be varied by suitably changing the distance of the eccentric connecting post 230 from the center of the wheel 228.

The washing unit 16, as heretofore indicated, is adapted to be controlled by a single operator 20 carried upon the operators platform 116 for customized washing of each vehicle. Thus the platform includes a chair 250 upon which the operator may be comfortably seated in front of an operators console 252. Conventional controls (not shown) are provided on the console for use by the operator in controlling the movement provided by each of the drive units 38, 44, 74, 122, 152, 172 and 226, as well as to regulating the flow of washing fluids to the spray heads 184, 186 and 188. For safety purposes in the wet environment of the washing facility, a twenty-four volt electrical system is preferably employed for operating the facility.

Both electricity for powering the motors of the washing unit and washing fluids for the spray heads may be provided by an overhead supply system, shown generally at 254 in FIG. 1. A conventional overhead track 256 extends longitudinally above the carrier system 18. Carriers 258 adapted to be pulled along the track carry a flexible conduit 260 in a series of loops, with suitable electrical cable and fluid supply lines disposed within the flexible conduit. The conduit extends downwardly along the travelling scaffold section 46 to the console 252 for connection of the electrical power to the various motors and the fluid supply lines to the hoses 202, 204 and 206. A spring loaded retracting cable (not show) may be provided within the track and affixed to the forward most carrier 258 in a conventional manner for allowing extension and retraction of the conduit as the washing unit 16 moves about the vehicle.

By way of example, a washing unit in accordance with the invention suitable for washing most over-the-road highway trucks may utilize a travelling scaffold section 46 suspended from a wheeled carriage 30 positioned about 15.25 feet (4.65 m) above the floor 88 of the wash bay. The top of the scaffold section will be about 14.45 feet (4.4 m) above the floor, allowing the wand or arm 142 to be raised to a height sufficient to extend over and wash the top of the vehicle. The arm 142 extends about 5.6 feet (1.70 m) from the center of the shaft 144 about which it swings upwardly or downwardly. The spray head 184 is located about 1.25 feet (0.40 m) from the center of the shaft and the spray head 186 is about 4.0 feet (1.25 m) from the spray head 184. The wheel spray head 188 is adjacent the spray head 184 and about 0.1 feet (0.03 m) from the outer end of the wand or arm 142. The wand or arm is adapted to rotate through 360° about its longitudinal axis and may preferably be swung about the shaft 144 between a vertical upright position and a vertical downward position.

In order to avoid undue twisting of the flexible conduit 260 and the hoses and wires therein, the travelling scaffold is preferably limited to pivoting through 270 degrees by the gear drive unit 54. The scaffold can thus begin at a corner and travel entirely around a vehicle facing all four sides, and then either return to the starting point for the next washing cycle or perform the succeeding wash cycle in the opposite direction. The nozzle tip units 214 are preferably of the fan discharge type and emit a 15 degree spray pattern. The tip units of the spray heads 184 and 186 are designed for delivery of washing fluid at a rate of at least 20 gallons per minute at 1500 to 2000 psi, while the tip unit of the wheel spray head 198 delivers washing fluid at a rate of at least 40 gallons per minute at 1500 to 2000 psi.

Truck washing facilities heretofore often employed hand held spray wands having a single spray nozzle of a narrower spray angle, discharging washing fluid at much lower pressure and volume. It was thus necessary to position the nozzle closer to the surface to be washed, at a distance on the order of one foot. The washing process thus proceeded vary slowly, and several workers with individual spray wands might be employed to speed up the washing process. Even then the washing was not as thorough as with the device of the present invention due to the low volume and pressure of the washing fluid. With the volume and pressure employed in the present invention, the nozzles can be operated at a distance of five or six feet from the surface to be washed, and yet thoroughly wash a large area. A spray wand could not be satisfactorily handled manually at the pressures and volumes utilized with the invention.

Figure 10:
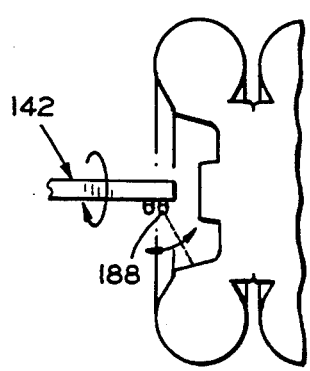
FIG. 10 is a fragmentary view illustrating use of the spray wand in washing a vehicle wheel.

As will be seen in FIG. 10, the invention is well adapted to the washing of vehicle wheels. For that procedure the wand or arm 142 is disposed in a generally horizontal altitude, and the spray heads 184 and 186 need not be utilized. Washing fluid is supplied to the wheel spray head 188 at the end of the arm. The travelling scaffold is maneuvered to bring the tip of the arm 142 into position adjacent the wheel. The arm is then rotated about its longitudinal axis and maneuvered to follow the circumference of the wheel, with the spray head 188 swung in an oscillating arc so that the entire tire, rim and wheel are thoroughly washed.

Reviewing briefly operation of the invention, a vehicle is moved into a position within the washing bay where the washing unit 16 may be maneuvered completely around the perimeter of the vehicle. The sequence to be followed in washing the vehicle would be at the discretion of the operator 20 and would depend upon a number of factors including the type of vehicle and the type and amount of material to be removed. In any event, washing could proceed by beginning as at the left rear corner of the vehicle as viewed in FIG. 1, and might first include raising the washing unit 78 to an upper position, with the arm 142 in a horizontal altitude as shown in broken lines in FIG. 2 for spraying the top of the vehicle. The spray heads 184 and 186 are activated and the travelling scaffold section 46 moves forwardly along the overhead carrier system with the spray heads oscillating in an arc so as to spray the covered surface. The travelling scaffold moves around the front of the vehicle and rearwardly along the opposite side to cover the entire vehicle top.

The travelling scaffold may move entirely around the vehicle to the starting point at the left rear corner, and then spray the vertical surfaces upon return movement in the opposite direction to the starting point. For such washing, the arm 142 and the spray heads thereon will be in the position illustrated in FIG. 1. Of course, the arm will be moved to a horizontal position and the washing unit will be suitably manipulated by the operator to wash the vertical front and rear surfaces of the vehicle tractor and trailer. The washing unit may then be suitably maneuvered to spray the undercarriage of the vehicle, as well as the wheels as afore-described. Of course, the spraying procedure may be repeated as appropriate for application of various washing materials in sequence as desired.

It is to be understood that the forms of the invention herewith shown and described are to be taken as illustrative embodiments of the same, and that various changes in the shape, size and arrangement of parts, as well as various procedural changes, may be resorted to without departing from the spirit of the invention.

What is claimed is:

1. Apparatus for washing a vehicle within a wash bay, comprising an overhead carrier framework supported above said vehicle, carriage means supported upon said carrier framework for movement around the perimeter of said vehicle, travelling scaffold means suspended from said carriage means for movement therewith around the perimeter of said vehicle, a washing unit mounted upon the travelling scaffold means for controlled movement vertically therealong, said washing unit including an elongated arm having a longitudinal axis and mounted for pivoted swinging movement in a generally vertical plane between upright and lowered positions, and at least one spray nozzle on said arm for spraying washing fluid against selected surfaces of said vehicle.

2. Apparatus for washing a vehicle as claimed in claim 1, including drive means for selectively rotating said suspended travelling scaffold means relative to said carriage means for maintaining said washing unit oriented toward said vehicle as said travelling scaffold means moves around the perimeter of said vehicle.

3. Apparatus for washing a vehicle as claimed in claim 1, including means for rotating said arm about its longitudinal axis to selected positions.

4. Apparatus for washing a vehicle as claimed in claim 1, including a plurality of said spray nozzles mounted on said arm at spaced locations therealong.

5. Apparatus for washing a vehicle as claimed in claim 1, wherein said at least one spray nozzle is mounted for pivotable swinging movement upon said arm, and including means for pivoting said spray nozzle back and forth through a predetermined arc.

6. Apparatus for washing a vehicle as claimed in claim 5, wherein said at least one spray nozzle discharges said washing fluid in the form of a generally planar fan, and said spray nozzle pivots in a direction generally perpendicular to said planar spray fan.

7. Apparatus for washing a vehicle as claimed in claim 6, including at least two spray nozzles on said arm spaced along said arm from another, and means interconnecting the spaced nozzles for pivoting said at least two nozzles back and forth in unison.

8. Apparatus for washing a vehicle as claimed in claim 7, wherein said at least spray arm is mounted for pivoted swinging movement about one of its ends and includes a free end remote from said one end, including two of said nozzles positioned adjacent said free end of said arm, and a third said nozzle spaced from said free end.

9. Apparatus for washing a vehicle as claimed in claim 1, wherein said overhead carrier framework comprises a pair of spaced, longitudinally extending side rails, a carriage beam extending transversely between said side rails, carrier means for supporting said carriage beam upon said side rails, and means driving said carrier means for controllably moving said carriage beam to selected positions along said side rails.

10. Apparatus for washing a vehicle as claimed in claim 9, wherein said carriage means comprises a wheeled carriage mounted upon said carriage beam for movement back and forth therealong, and drive means for moving said carriage means to selected positions along said carriage beam.

11. Apparatus for washing a vehicle as claimed in claim 1, wherein said wash bay includes a floor, and including caster wheel means at the lower end of said travelling scaffold means for rollingly engaging said floor and bearing at least a portion of the weight of said travelling scaffold.

12. Apparatus for washing a vehicle as claimed in claim 11, including compression spring means acting between said caster wheel means and said travelling scaffold for limiting the weight of said travelling scaffold borne by said caster wheel means.

13. Apparatus for washing a vehicle within a wash bay, comprising an overhead carrier framework supported above said vehicle, carriage means supported upon said carrier framework for movement around the perimeter of said vehicle, travelling scaffold means suspended from said carriage means for movement therewith around the perimeter of said vehicle, a washing unit mounted upon the travelling scaffold means for controlled movement vertically therealong, said washing unit including an arm mounted for swinging movement in a generally vertical plane between upright and lowered positions, and at least one spray nozzle on said arm for spraying washing fluid against selected surfaces of said vehicle, said travelling scaffold means comprising a framework including a pair of spaced upright channels interconnected by cross members, and an elevator section carried by said framework for upward and downward movement therealong, said washing unit being mounted upon said elevator section for movement upwardly and downwardly along said elevator section simultaneous with movement of said elevator section upward and downward along said framework.

14. Apparatus for washing a vehicle as claimed in claim 13, including winch means mounted at the upper end of said framework, said winch means having a selectively extensible and retractable cable affixed to said elevator section for selectively raising and lowering said elevator section.

15. Apparatus for washing a vehicle as claimed in claim 14, including a second cable having opposite ends, means securing said second cable at one of its ends to the lower end of said framework, means securing said second cable at the other of its ends to said washing unit, and pulley means affixed to said elevator section and over which said second cable passes, whereby as said elevator section is raised and lowered along said framework by said winch means, said washing unit is simultaneously raised and lowered along said elevator section.

16. Apparatus for washing a vehicle as claimed in claim 13 including an operators platform having an operator's console carried by said elevator section.

* * * * *